(12) United States Patent
Liu et al.

(10) Patent No.: US 12,228,970 B2
(45) Date of Patent: Feb. 18, 2025

(54) FLEXIBLE DISPLAY STRUCTURE, METHOD FOR MANUFACTURING THE SAME, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Shaokui Liu, Beijing (CN); Wei Qing, Beijing (CN); Qiang Tang, Beijing (CN); Zhihui Wang, Beijing (CN); Xingguo Liu, Beijing (CN); Xianlei Bi, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 287 days.

(21) Appl. No.: 17/613,120

(22) PCT Filed: Mar. 10, 2021

(86) PCT No.: PCT/CN2021/079928
§ 371 (c)(1),
(2) Date: Nov. 22, 2021

(87) PCT Pub. No.: WO2021/213048
PCT Pub. Date: Oct. 28, 2021

(65) Prior Publication Data
US 2022/0206538 A1    Jun. 30, 2022

(30) Foreign Application Priority Data
Apr. 20, 2020 (CN) .......................... 202010312890.5

(51) Int. Cl.
*G06F 1/16* (2006.01)
(52) U.S. Cl.
CPC .......... *G06F 1/1652* (2013.01); *G06F 1/1656* (2013.01)
(58) Field of Classification Search
CPC ............................. G06F 1/1652; G06F 1/1656
See application file for complete search history.

(56) References Cited

U.S. PATENT DOCUMENTS

2016/0043153 A1    2/2016 Min
2018/0011516 A1*   1/2018 Seo ........................ G06F 1/1652
(Continued)

FOREIGN PATENT DOCUMENTS

CN    105468188 A    4/2016
CN    208444535 U    1/2019
(Continued)

OTHER PUBLICATIONS

First Examination Report of counterpart UK application No. GB2208284.6 issued on Jul. 15, 2024.
(Continued)

*Primary Examiner* — Anthony Q Edwards
(74) *Attorney, Agent, or Firm* — Lippes Mathias LLP

(57) ABSTRACT

Provided is a flexible display structure, including a reinforcing strip, and a flexible display panel and a supporting layer that are laminated. The flexible display panel is provided with a first surface and a second surface opposite to each other, and a first side surface connecting the first surface and the second surface, and the reinforcing strip is disposed on the first side surface and configured to adhere the flexible display panel to the supporting layer.

20 Claims, 5 Drawing Sheets

(56) References Cited

U.S. PATENT DOCUMENTS

2019/0348629 A1* 11/2019 Hu .................. H10K 77/111
2021/0191467 A1* 6/2021 Sunwoo ................ G06F 1/1641

FOREIGN PATENT DOCUMENTS

| CN | 110164310 A | 8/2019 |
| CN | 210244011 U | 4/2020 |
| CN | 211604571 U | 9/2020 |
| TW | 200933277 A | 8/2009 |

OTHER PUBLICATIONS

Second Examination Report of counterpart UK application No. GB2208284.6 issued on Sep. 24, 2024.
Intention to Grant of counterpart UK application No. GB2208284.6 issued on Nov. 12, 2024.

* cited by examiner

FLEXIBLE DISPLAY STRUCTURE, METHOD FOR MANUFACTURING THE SAME, AND DISPLAY DEVICE

CROSS-REFERENCE TO RELATED APPLICATION

This application is a 371 of PCT Application PCT/CN2021/079928, filed on Mar. 10, 2021, which claims priority to Chinese Patent Application No. 202010312890.5, filed on Apr. 20, 2020 and entitled "FLEXIBLE DISPLAY STRUCTURE, METHOD FOR MANUFACTURING THE SAME, AND DISPLAY DEVICE", the disclosures of which are herein incorporated by reference in their entireties.

TECHNICAL FIELD

The present disclosure relates to the field of display devices, particularly relates to a flexible display structure, a method for manufacturing the same, and a display device.

BACKGROUND

A flexible display screen refers to a display screen that is bendable and deformable. Compared with a traditional display screen, the flexible display screen that is bendable or foldable has advantages of high impact resistance, strong shock resistance, lightweight, easiness in carrying and the like, and thereby has been applied more and more wildly.

As an important component of the flexible display screen, a flexible display structure generally includes a flexible display panel and a supporting layer which are adhered to as an integrity. The flexible display screen may be bent for many times during use, and the related flexible display screen tends to have such a problem that the flexible display panel is separated and delaminated from the supporting layer after the many times of bending, which may affect normal use of the flexible display screen.

SUMMARY

Embodiments of the present disclosure provide a flexible display structure, a method for manufacturing the same, and a display device. The technical solutions are as follows.

In an aspect, an embodiment of the present disclosure provides a flexible display structure. The flexible display structure includes a reinforcing strip, and a flexible display panel and a supporting layer that are laminated. The flexible display panel is provided with a first surface and a second surface opposite to each other, and a first side surface connecting the first surface and the second surface, and the reinforcing strip is disposed on the first side surface and configured to adhere the flexible display panel to the supporting layer.

Optionally, the supporting layer is provided with a third surface and a fourth surface opposite to each other, and a second side surface connecting the third surface and the fourth surface, wherein the third surface is attached to the second surface, and an orthographic projection of the flexible display panel on the third surface is within the third surface; and wherein the reinforcing strip is configured to adhere the third surface and the first side surface, or the reinforcing strip is disposed on the second side surface and configured to adhere the third surface, the first side surface and the second side surface.

Optionally, the supporting layer is provided with a third surface and a fourth surface opposite to each other, and a second side surface connecting the third surface and the fourth surface, wherein the third surface is attached to the second surface, an orthographic projection of the flexible display panel on the third surface is in coincidence with the third surface, and the reinforcing strip is configured to adhere the first side surface and the second side surface.

Optionally, the reinforcing strip is distributed between a plane where the first surface is disposed and a plane where a surface of the supporting layer distal from the flexible display panel is disposed.

Optionally, the flexible display structure further includes a transparent cover plate laminated on the flexible display panel, the flexible display panel is disposed between the transparent cover plate and the supporting layer, and the reinforcing strip is configured to adhere the transparent cover plate and the flexible display panel.

Optionally, the transparent cover plate is provided with a fifth surface and a sixth surface opposite to each other, and a third side surface connecting the fifth surface and the sixth surface, wherein the sixth surface is attached to the first surface, and an orthographic projection of the flexible display panel on the sixth surface is within the sixth surface; and wherein the reinforcing strip is configured to adhere the sixth surface and the first side surface, or the reinforcing strip is disposed on the third side surface and configured to adhere the first side surface, the sixth surface and the third side surface.

Optionally, the transparent cover plate is provided with a fifth surface and a sixth surface opposite to each other, and a third side surface connecting the fifth surface and the sixth surface, wherein the sixth surface is attached to the first surface, an orthographic projection of the flexible display panel on the sixth surface is in coincidence with the sixth surface, and the reinforcing strip is configured to adhere the first side surface and the third side surface.

Optionally, the reinforcing strip is distributed between a plane where the fifth surface is disposed and a plane where the fourth surface is disposed.

Optionally, a surface, distal from the first side surface, of the reinforcing strip is a flat surface or a smooth curved surface.

Optionally, a distance between the first side surface and a surface, distal from the first side surface, of the reinforcing strip ranges from 5 µm to 300 µm.

Optionally, the reinforcing strip is arranged around the first side surface.

Optionally, the reinforcing strip is formed by curing an ultraviolet-moisture dual-curing adhesive.

Optionally, a storage modulus of the reinforcing strip ranges from 60 kpa to 150 kpa and a shear strength of the reinforcing strip ranges from 3 kgf/cm$^2$ to 5 kgf/cm$^2$.

Optionally, an adhesive layer is provided between the flexible display panel and the supporting layer, and an orthographic projection of the adhesive layer on the supporting layer is within an orthographic projection of the flexible display panel on the supporting layer.

Optionally, the flexible display panel includes a panel body, a polarizer and a polyethylene terephthalate film that are laminated, wherein the polarizer and the polyethylene terephthalate film are disposed on two sides of the panel body respectively, and the polyethylene terephthalate film and the supporting layer are disposed on a same side of the panel body.

In another aspect, an embodiment of the present disclosure provides a method for manufacturing a flexible display structure. The manufacturing method includes:

providing a flexible display panel and a supporting layer that are laminated, wherein the flexible display panel is provided with a first surface and a second surface opposite to each other, and a first side surface connecting the first surface and the second surface; and forming a reinforcing strip on the first side surface, wherein the reinforcing strip is configured to adhere the flexible display panel to the supporting layer.

Optionally, forming the reinforcing strip on the first side surface includes:

spraying an ultraviolet-moisture dual-curing adhesive on the first side surface via a nozzle; and forming the reinforcing strip by curing the ultraviolet-moisture dual-curing adhesive.

Optionally, forming the reinforcing strip by curing the ultraviolet-moisture dual-curing adhesive includes:

irradiating, while spraying the ultraviolet-moisture dual-curing adhesive on the first side surface, the ultraviolet-moisture dual-curing adhesive sprayed on the first side surface with ultraviolet light until the ultraviolet-moisture dual-curing adhesive is cured into the reinforcing strip.

Optionally, forming the reinforcing strip by curing the ultraviolet-moisture dual-curing adhesive includes:

irradiating, while spraying the ultraviolet-moisture dual-curing adhesive on the first side surface, the ultraviolet-moisture dual-curing adhesive sprayed on the first side surface with ultraviolet light until the ultraviolet-moisture dual-curing adhesive is semi-cured; and allowing the flexible display panel to stand still until the ultraviolet-moisture dual-curing adhesive is completely cured.

In still another aspect, an embodiment of the present disclosure further provides a display device including the flexible display structure as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the object, technical solutions and advantages of the present disclosure clearer, the embodiments of the present disclosure are described in detail below with reference to the accompanying drawings.

Figure 1:
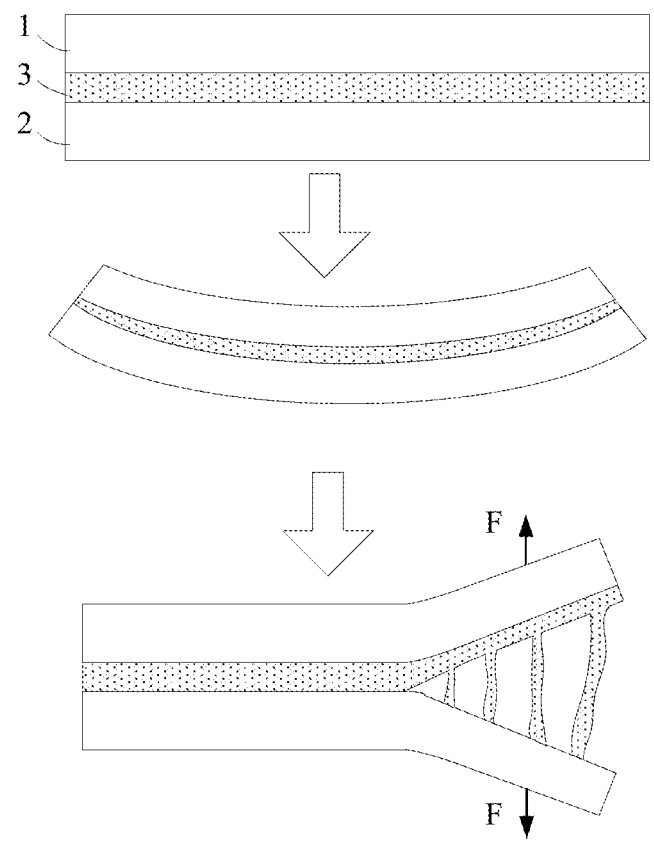
FIG. 1 shows a schematic diagram of a flexible display structure as delaminated according to the related art.

FIG. 1 shows a schematic diagram of a flexible display structure as delaminated according to the related art. As shown in FIG. 1, the flexible display structure includes a flexible display panel 1 and a supporting layer 2, and the supporting layer 2 is generally made of stainless steel. The flexible display panel 1 and the supporting layer 2 are adhered to each other by an adhesive layer 3. Due to a great difference in modulus between the flexible display panel 1 and the supporting layer 2, the deformation between the flexible display panel 1 and the supporting layer 2 is not synchronized when the flexible display structure is bent, which may cause a great dislocation between the flexible display panel 1 and the supporting layer 2. In addition, the stress as caused by the dislocation has a component force F shown in FIG. 1, and a cohesive force generated by the adhesive layer 3 is not enough to offset the dislocation. Thus, the flexible display panel 1 and the supporting layer 2 may be eventually separated from each other under the action of the component force F, which may lead to delamination of the flexible display structure and thereby affect the normal use of the flexible display screen. At present, the flexible display structure is generally subjected to a bending test, and only the product passing the bending test is sold, so as to reduce the possibility of delamination of the flexible display screen in use. However, for the bending test of the related flexible display screen, a situation where the flexible display panel is separated and delaminated from the supporting layer may for example occur in a bending test with a bending radius of 2.5 mm. Thus, the product fails to pass the bending test, thereby causing a low product yield.

Figure 2:
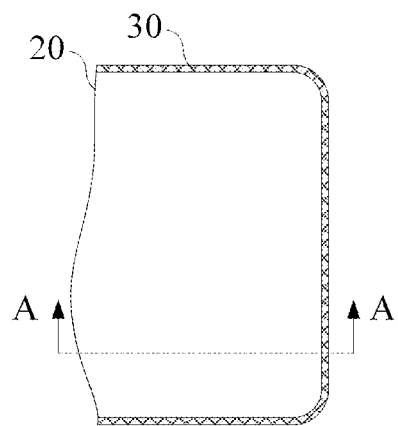
FIG. 2 shows a partial structural diagram of a flexible display structure according to an embodiment of the present disclosure.
Figure 3:
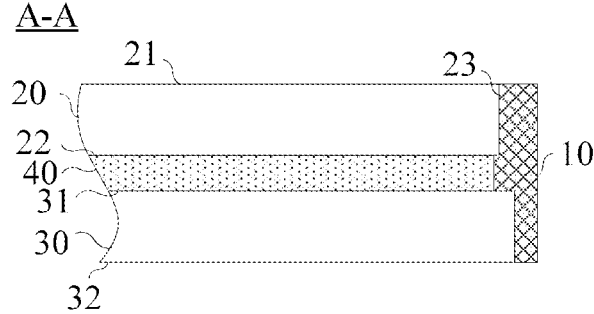
FIG. 3 shows a cross-sectional view of FIG. 2 at A-A.

FIG. 2 shows a partial top view of a flexible display structure according to an embodiment of the present disclosure. FIG. 3 shows a cross-sectional view of FIG. 2 at A-A. As shown in FIG. 3, the display device includes a reinforcing strip 10, a flexible display panel 20, and a supporting layer 30 that are laminated.

The flexible display panel 20 is provided with a first surface 21 and a second surface 22 opposite to each other, and a first side surface 23 connecting the first surface 21 and the second surface 22. The reinforcing strip 10 is disposed on the first side surface 23 and configured to adhere the flexible display panel 20 to the supporting layer 30.

The flexible display panel is provided with a first surface and a second surface opposite to each other, and a first side surface connecting the first surface and the second surface. Thus, by providing a reinforcing strip on the first side surface, the reinforcing strip that adheres the flexible display panel to the supporting layer can form a rather tight bonding between the flexible display panel and the supporting layer. Therefore, the reinforcing strip can improve a bending performance of the flexible display structure and reduce the possibility that the flexible display panel is separated and delaminated from the supporting layer in normal use.

As shown in FIG. 3, an adhesive layer 40 is provided between the flexible display panel 20 and the supporting layer 30, and an orthographic projection of the adhesive layer 40 on the supporting layer 30 is within an orthographic projection of the flexible display panel 20 on the supporting layer 30. The adhesive layer 40 is configured to adhere the flexible display panel 20 and the supporting layer 30. During the bonding, the adhesive layer 40 may be deformed under a certain degree of squeezing, and may thereby overflow from the flexible display panel 20 and the supporting layer 30 therebetween. Thus, the area of the adhesive layer 40 may be controlled to allow the orthographic projection of the adhesive layer 40 on the supporting layer 30 to be within the orthographic projection of the flexible display panel 20 on the supporting layer 30, such that the adhesive layer 40 may be prevented from overflowing after the squeezing.

In an exemplary embodiment, the adhesive layer 40 may be an optical adhesive or foam.

Figure 4:
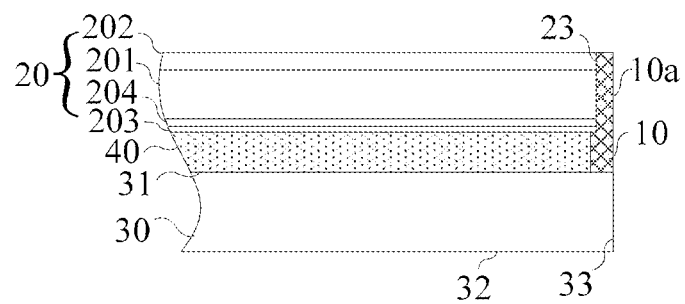
FIG. 4 shows a partial structural diagram of a flexible display structure according to an embodiment of the present disclosure.

FIG. 4 shows a partial structural diagram of a flexible display structure according to an embodiment of the present disclosure. As shown in FIG. 4, the flexible display panel 20 may include a panel body 201, a polarizer 202, and a polyethylene terephthalate (PET) film 203 that are laminated. The polarizer 202 and the PET film 203 are disposed on two sides of the panel body 201, respectively, and the PET film 203 and the supporting layer 30 are disposed on a same side of the panel body 201. The PET film 203 may be adhered to the panel body 201 via a pressure-sensitive adhesive 204, and adhered to the supporting layer 30 via an adhesive layer 40.

The panel body 201 may be an organic light-emitting diode (OLED) display panel.

Optionally, the reinforcing strip 10 is formed by curing an ultraviolet-moisture dual-curing adhesive. The reinforcing strip 10 formed by curing with the ultraviolet-moisture dual-curing adhesive is soft in texture, and has a storage modulus of 60 kpa to 150 kpa and a shear strength of 3 kgf/cm$^2$ to 5 kgf/cm$^2$. The relatively high storage modulus enables the reinforcing strip 10 to absorb most of the impact force, and the relatively high shear strength may overcome the stress as generated while bending the flexible display structure and thereby reduce the risk of delamination of the flexible display structure. When the storage modulus is 60 kpa to 150 kpa, the reinforcing strip 10 may absorb more than 60% of the impact force. The ultraviolet-moisture dual-curing adhesive further has a low glass transition temperature as low as −35° C. to −48° C., and has a good waterproof performance, such that the flexible display structure may be well prevented from being damaged by bumps or being corroded by water vapor while preventing the flexible display panel 20 from being delaminated from the supporting layer 30.

The surface 10a, distal from the first side surface 23, of the reinforcing strip 10 may be a flat surface or a smooth curved surface, which means that the surface 10a of the reinforcing strip 10 is smooth. If the surface 10a of the reinforcing strip 10 is uneven, the reinforcing strip 10 is likely to be damaged during the use of the flexible display structure. Thus, it helps to extend the life of the reinforcing strip 10 to configure the surface 10a of the reinforcing strip 10 to be flat or smooth.

Optionally, a distance between the first side surface 23 and the surface 10a, distal from the first side surface 23, of the reinforcing strip 10 may range from 5 µm to 300 µm. That is, the reinforcing strip 10 may have a thickness of 5 µm to 300 µm. Since a rather thick reinforcing strip 10 is not conducive to the use of the flexible display structure, the reinforcing strip 10 may be configured as thin as possible under the premise of ensuring that the reinforcing strip 10 has sufficient strength to connect the flexible display panel 20 and the supporting layer 30. In an exemplary embodiment, the reinforcing strip 10 may have a thickness of 5 µm to 50 µm.

The reinforcing strip 10 is arranged around the first side surface 23 of the display panel 20. The delamination may occur on all sides of the flexible display structure while bending the flexible display structure. Whereas, the delamination phenomenon of the flexible display structure may be further avoided by arranging the reinforcing strip 10 around the flexible display panel 20. It shall be noted that the flexible display structure according to the embodiments of the present disclosure may be in a rectangle shape or an irregular shape, such as a circle or an ellipse. In the related art, the bending of the flexible display structure may easily cause delamination if the flexible display structure is in an irregular shape. However, in embodiments of the present application, the delamination phenomenon of the flexible display structure may be effectively avoided by arranging the reinforcing strip 10 around the flexible display panel 20.

As shown in FIG. 4, the supporting layer 30 is provided with a third surface 31 and a fourth surface 32 opposite to each other, and a second side surface 33 connecting the third surface 31 and the fourth surface 32. The third surface 31 is attached to the second surface 22, and the orthographic projection of the flexible display panel 20 on the third surface 31 is within the third surface 31.

The reinforcing strip 10 may be disposed on the third surface 31. That is, the reinforcing strip 10 adheres the first side surface 23 of the flexible display panel 20 to the third surface 31 of the supporting layer 30 to prevent the flexible display panel 20 from being separated from the supporting layer 30 when the flexible display structure is bent and thereby prevent the delamination of the flexible display structure.

Figure 5:
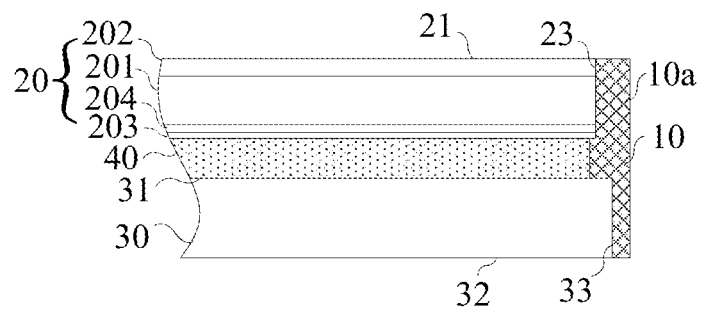
FIG. 5 shows a partial structural diagram of a flexible display structure according to an embodiment of the present disclosure.

FIG. 5 shows a partial structural diagram of a flexible display structure according to an embodiment of the present disclosure. The difference between the flexible display structure shown in FIG. 5 and the flexible display structure shown in FIG. 4 is that the reinforcing strip 10 is also disposed on the second side surface 33. That is, the reinforcing strip 10 adheres the first side surface 23 of the flexible display panel 20, and the third surface 31 and the second side surface 33 of the supporting layer 30. A portion of the reinforcing strip 10 covers the second side surface 33, which may increase a contact area between the reinforcing strip 10 and the supporting layer 30 and enlarge the bonding force between the reinforcing strip 10 and the supporting layer 30, thereby further preventing delamination of the flexible display structure as caused by the separation between the flexible display panel 20 and the supporting layer 30.

The reinforcing strip 10 may be distributed between a plane where the first surface 21 of the flexible display panel 20 is disposed and a plane where the fourth surface 32 of the supporting layer 30 is disposed. If the reinforcing strip 10 covers the first surface 21 of the flexible display panel 20 or the fourth surface 32 of the supporting layer 30, the reinforcing strip 10 may protrude from the first surface 21 and the fourth surface 32, which is unaesthetic on one hand. On the other hand, the portions of the reinforcing strip 10 on the first surface 21 and the fourth surface 32 are easy to fall off during use, which may cause the reinforcing strip 10 on the first side surface 23 to fall off together.

As shown in FIG. 5, the reinforcing strip 10 may be flush with the first surface 21 and the fourth surface 32, such that the contact area of the reinforcing strip 10 with the flexible display panel 20 and the supporting layer 30 may be maximized. In addition, the bonding force between the reinforcing strip 10 and the supporting layer 30 may be enlarged, which may further prevent the flexible display panel 20 from being separated from the supporting layer 30 and thereby prevent the delamination of the flexible display structure.

Figure 6:
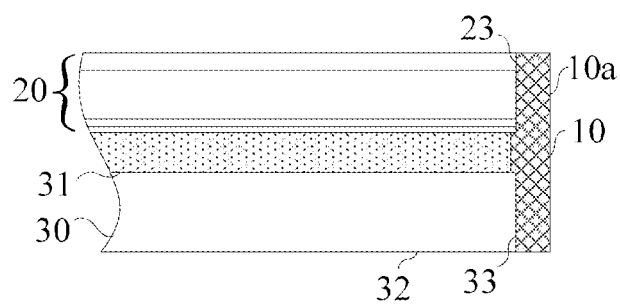
FIG. 6 shows a schematic structural diagram of a flexible display structure according to an embodiment of the present disclosure.

FIG. 6 shows a schematic diagram of a flexible display structure according to an embodiment of the present disclosure. The difference from the flexible display structure shown in FIG. 5 lies in that the orthographic projection of the flexible display panel 20 on the third surface 31 in FIG. 6 is in coincidence with the third surface 31.

In this flexible display structure, the reinforcing strip 10 is also disposed on the second side surface 33. That is, the reinforcing strip 10 adheres the first side surface 23 of the flexible display panel 20 to the second side surface 33 of the supporting layer 30 to prevent the flexible display panel 20 from being separated from the supporting layer 30 when the flexible display structure is bent and thereby prevent the delamination of the flexible display structure.

Figure 7:
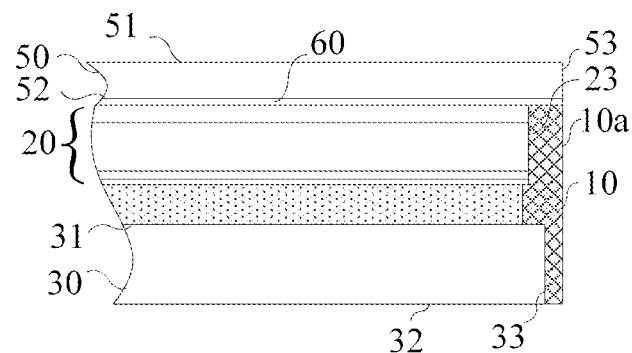
FIG. 7 shows a schematic structural diagram of a flexible display structure according to an embodiment of the present disclosure.

FIG. 7 shows a schematic diagram of a flexible display structure according to an embodiment of the present disclosure. As shown in FIG. 7, the flexible display structure further includes a transparent cover plate 50. The transparent cover plate 50 is laminated on the flexible display panel 20, and the flexible display panel 20 is disposed between the transparent cover plate 50 and the supporting layer 30. The transparent cover plate 50 may protect the flexible display panel 20 from being scratched.

The transparent cover plate 50 may be adhered to the flexible display panel 20 via an optical adhesive layer 60.

Optionally, the transparent cover plate 50 may be made of colorless polyimide (CPI) or ultra thin glass (UTG). Both CPI and UTG have good transparency and strength, and may protect the flexible display structure without affecting the brightness of the flexible display structure.

As shown in FIG. 7, the transparent cover plate 50 is provided with a fifth surface 51 and a sixth surface 52 opposite to each other, and a third side surface 53 connecting the fifth surface 51 and the sixth surface 52. The sixth surface 52 is attached to the first surface 21, and an orthographic projection of the flexible display panel 20 on the sixth surface 52 is within the sixth surface 52.

The reinforcing strip 10 may adhere the transparent cover plate 50 to the flexible display panel 20 to prevent the transparent cover plate 50 from being separated from the flexible display panel 20.

The reinforcing strip 10 may be disposed on the sixth surface 52. That is, the reinforcing strip 10 adheres the sixth surface 52 of the transparent cover plate 50 and the first side surface 23 of the flexible display panel 20 to prevent the flexible display panel 20 from being separated from the transparent cover plate 50 when the flexible display structure is bent and thereby prevent the delamination of the flexible display structure.

Figure 8:
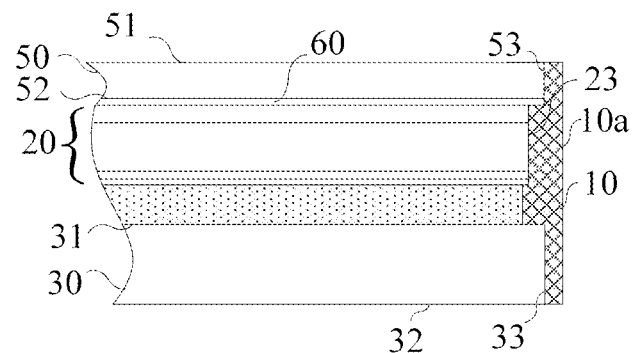
FIG. 8 shows a schematic structural diagram of a flexible display structure according to an embodiment of the present disclosure.

FIG. 8 shows a schematic diagram of a flexible display structure according to an embodiment of the present disclosure. The difference between the flexible display structure as shown in FIG. 8 and the flexible display structure shown in FIG. 7 is that the reinforcing strip 10 in the flexible display structure shown in FIG. 8 is also disposed on the third side surface 53. That is, the reinforcing strip 10 adheres the first side surface 23 of the flexible display panel 20, and the sixth surface 52 and the third side surface 53 of the transparent cover plate 50. A portion of the reinforcing strip 10 covers the third side surface 53, which may increase the contact area between the reinforcing strip 10 and the transparent cover plate 50 and enlarge the bonding force between the reinforcing strip 10 and the transparent cover plate 50, thereby further preventing delamination of the flexible display structure as caused by the separation between the flexible display panel 20 and the transparent cover plate 50.

The reinforcing strip 10 may be distributed between a plane where the fifth surface 51 of the transparent cover plate 50 is disposed and a plane where the fourth surface 32 of the supporting layer 30 is disposed. If the reinforcing strip 10 covers the fifth surface 51 of the transparent cover plate 50 or the fourth surface 32 of the supporting layer 30, the reinforcing strip 10 may protrude from the fifth surface 51 and the fourth surface 32, which is unaesthetic on one hand. On the other hand, the portions of the reinforcing strip 10 on the fifth surface 51 and the fourth surface 32 are easy to fall off during use, which may cause the reinforcing strip 10 on the first side surface 23 to fall off together.

As shown in FIG. 8, the reinforcing strip 10 may be flush with the fifth surface 51 and the fourth surface 32, such that the contact area of the reinforcing strip 10 with the transparent cover plate 50, the flexible display panel 20, and the supporting layer 30 may be maximized. In addition, the bonding force between the reinforcing strip 10 and the transparent cover plate 50 may be enlarged, which prevents the flexible display panel 20 from being separated from the transparent cover plate 50 and thereby prevents the delamination of the flexible display structure.

Figure 9:
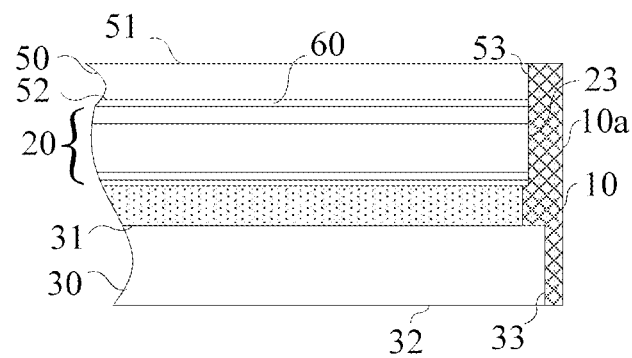
FIG. 9 shows a schematic structural diagram of a flexible display structure according to an embodiment of the present disclosure.

FIG. 9 shows a schematic diagram of a flexible display structure according to an embodiment of the present disclosure. The difference from the flexible display structure shown in FIG. 8 lies in that an orthographic projection of the flexible display panel 20 of the flexible display structure shown in FIG. 9 on the third surface 52 is in coincidence with the sixth surface 52.

In this flexible display structure, the reinforcing strip 10 is further disposed on the third side surface 53. That is, the reinforcing strip 10 adheres the first side surface 23 of the flexible display panel 20 to the third side surface 53 of the transparent cover plate 50 to prevent the flexible display panel 20 from being separated from the transparent cover plate 50 when the flexible display structure is bent and thereby prevent the delamination of the flexible display structure.

For the flexible display structures shown in FIGS. 7-9, the supporting layer 30 may be provided in a fashion shown in FIG. 6.

An embodiment of the present disclosure further provides a display device, and the display device includes the display structure as shown in any one of FIGS. 3 to 9. In an exemplary embodiment, the display device may be any product or component having a display function, such as a mobile phone, a tablet computer, a TV set, a display, a notebook computer, a digital photo frame, a navigator etc.

Figure 10:
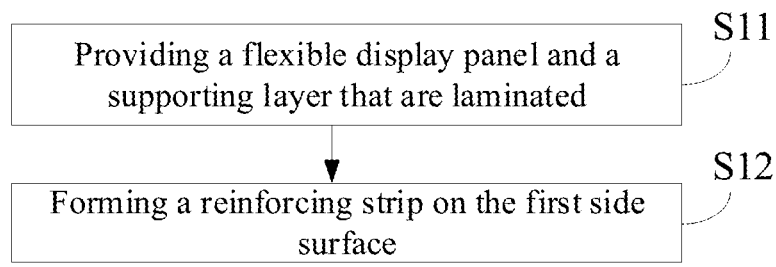
FIG. 10 shows a method for manufacturing a flexible display structure according to an embodiment of the present disclosure.

FIG. 10 shows a manufacturing method of a flexible display structure according to an embodiment of the present disclosure. This method is configured to manufacture the flexible display structures as shown in FIGS. 3-9. As shown in FIG. 10, the method includes following steps.

In step S11, a flexible display panel and a supporting layer that are laminated are provided.

The flexible display panel herein is provided with a first surface and a second surface opposite to each other, and a first side surface connecting the first surface and the second surface.

In step S12, a reinforcing strip is formed on the first side surface.

The reinforcing strip is configured to adhere the flexible display panel to the supporting layer.

The flexible display panel is provided with a first surface and a second surface opposite to each other, and a first side surface connecting the first surface and the second surface. Thus, by providing a reinforcing strip on the first side surface, the reinforcing strip that adheres the flexible display panel to the supporting layer can form a rather tight bonding between the flexible display panel and the supporting layer. Therefore, the reinforcing strip can improve a bending performance of the flexible display structure and reduce the possibility that the flexible display panel is separated and delaminated from the supporting layer in normal use.

Figure 11:
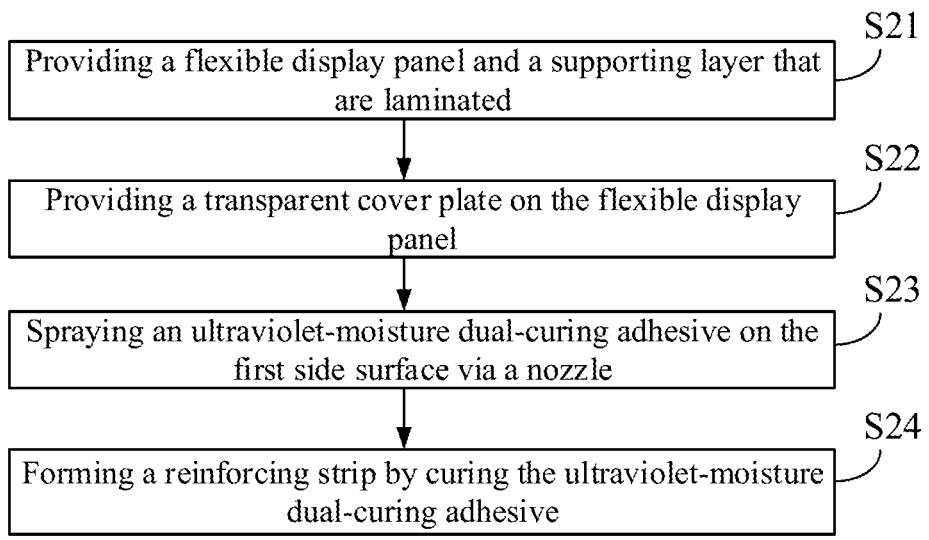
FIG. 11 shows a method for manufacturing a flexible display structure according to an embodiment of the present disclosure.

FIG. 11 shows a method for manufacturing of a flexible display structure according to an embodiment of the present disclosure. This method may be configured to manufacture the flexible display structures as shown in FIGS. 3-9. The method is described in detail below with reference to FIGS. 12 to 14 by taking the flexible display structure shown in FIG. 7 as an example. As shown in FIG. 11, the method includes following steps.

In step S21, a flexible display panel and a supporting layer that are laminated are provided.

Figure 12:
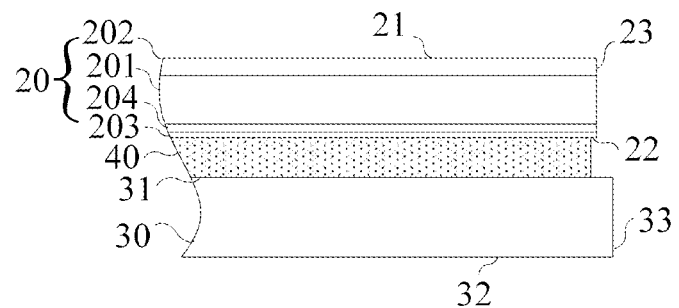
FIG. 12 shows a schematic structural diagram of a flexible display panel and a supporting layer according to an embodiment of the present disclosure.

FIG. 12 shows a schematic structural diagram of a flexible display panel and a supporting layer according to an embodiment of the present disclosure. As shown in FIG. 12, the flexible display panel 20 is provided with a first surface 21 and a second surface 22 opposite to each other, and a first side surface 23 connecting the first surface 21 and the second surface 22. The supporting layer 30 is provided with a third surface 31 and a fourth surface 32 opposite to each other, and a second side surface 33 connecting the third surface 31 and the fourth surface 32. The third surface 31 herein is attached to the second surface 22.

The flexible display panel 20 may include a panel body 201, a polarizer 202, and a PET film 203 that are laminated. The polarizer 202 and the PET film 203 are disposed on two sides of the panel body 201, respectively, and the PET film 203 and the supporting layer 30 are disposed on a same side of the panel body 201. The PET film 203 may be adhered to the panel body 201 via a pressure-sensitive adhesive, and adhered to the supporting layer 30 via an adhesive layer 40.

After the flexible display panel 20 is adhered to the supporting layer 30, the flexible display panel 20 may be laser cut to ensure that a tolerance of an outer contour of the flexible display panel 20 meets the requirement in design.

In step S22, a transparent cover plate is provided on the flexible display panel.

Figure 13:
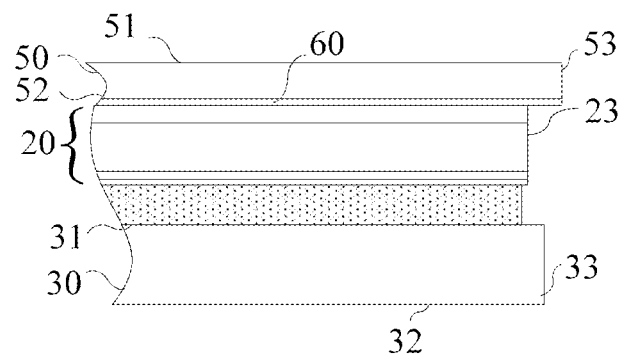
FIG. 13 shows a schematic structural diagram of a flexible display panel provided with a transparent cover plate according to an embodiment of the present disclosure.

FIG. 13 shows a schematic structural diagram of a flexible display panel provided with a transparent cover plate according to an embodiment of the present disclosure. As shown in FIG. 13, the transparent cover plate 50 is laminated on the flexible display panel 20, and the flexible display panel 20 is disposed between the transparent cover plate 50 and the supporting layer 30. The transparent cover plate 50 may protect the flexible display panel 20 from being scratched.

The transparent cover plate 50 may be adhered to the flexible display panel 20 via an optical adhesive layer 60.

Optionally, the transparent cover plate 50 may be CPI or UTG. Both CPI and UTG have good transparency and strength, and may protect the flexible display structure without affecting the brightness of the flexible display structure.

As shown in FIG. 13, the transparent cover plate 50 is provided with a fifth surface 51 and a sixth surface 52 opposite to each other, and a third side surface 53 connecting the fifth surface 51 and the sixth surface 52. The sixth surface 52 herein is attached to the first surface 21.

In step S23, an ultraviolet-moisture dual-curing adhesive is sprayed on the first side surface via a nozzle.

Figure 14:
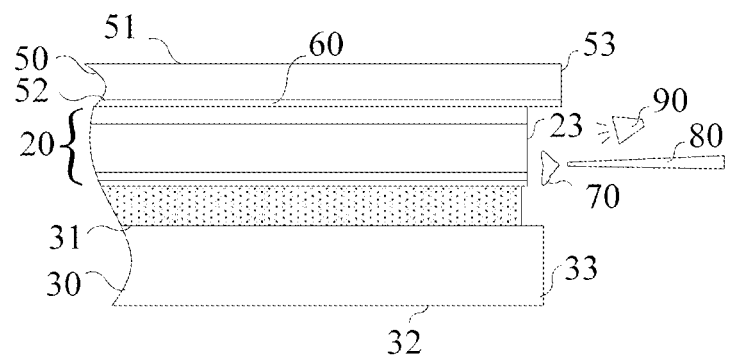
FIG. 14 is a schematic diagram of a process of spraying an ultraviolet-moisture dual-curing adhesive according to an embodiment of the present disclosure.

FIG. 14 is a schematic diagram of a process of spraying an ultraviolet-moisture dual-curing adhesive according to an embodiment of the present disclosure. As shown in FIG. 14, the ultraviolet-moisture dual-curing adhesive 70 is sprayed via the nozzle 80. The pressure generated by the nozzle 80 allows the ultraviolet-moisture dual-curing adhesive 70 to fill tiny gaps on the first surface 23, such that the bonding force between the reinforcing strip 10 and the first surface 23 is enlarged after the ultraviolet-moisture dual-curing adhesive 70 is cured.

In step S24, the reinforcing strip is formed by curing the ultraviolet-moisture dual-curing adhesive.

Referring to FIG. 14, the curing of the ultraviolet-moisture dual-curing adhesive 70 may be performed in following fashions.

In some possible embodiments, while spraying the ultraviolet-moisture dual-curing adhesive 70 on the first side surface 23, the ultraviolet-moisture dual-curing adhesive 70 as sprayed on the first side surface 23 is irradiated with ultraviolet light until the ultraviolet-moisture dual-curing adhesive 70 is cured into the reinforcing strip 10.

The ultraviolet-moisture dual-curing adhesive 70 may be cured under the irradiation of ultraviolet light. The ultraviolet-moisture dual-curing adhesive 70 has good fluidity before curing. Thus, by performing the irradiation with ultraviolet light while spraying the ultraviolet-moisture dual-curing adhesive 70, the ultraviolet-moisture dual-curing adhesive 70 may be solidified and formed rapidly and thereby prevented from flowing. The reinforcing strip 10 may be acquired by curing the ultraviolet-moisture dual-curing adhesive 70 completely by controlling the intensity and irradiating duration of the ultraviolet light. In the process of performing ultraviolet light irradiation, an ultraviolet light irradiating device 90 may move together with the nozzle 80.

In some other possible embodiments, while spraying the ultraviolet-moisture dual-curing adhesive 70 on the first side surface 23, the ultraviolet-moisture dual-curing adhesive 70 as sprayed on the first side surface 23 is irradiated with ultraviolet light until the ultraviolet-moisture dual-curing adhesive 70 is semi-cured, and then, the flexible display panel 20 stands still until the ultraviolet-moisture dual-curing adhesive 70 is completely cured.

The ultraviolet-moisture dual-curing adhesive 70 may not only be cured under ultraviolet light, but also be cured spontaneously by absorbing moisture in the air. By controlling the intensity and irradiating duration of the ultraviolet light, the ultraviolet-moisture dual-curing adhesive 70 may be semi-cured and may for example be cured by 60% to 70%, which may be specifically judged based on the fluidity of the ultraviolet-moisture dual-curing adhesive 70. The irradiation is performed as long as the ultraviolet-moisture dual-curing adhesive 70 does not flow. Then, the ultraviolet-moisture dual-curing adhesive 70 is completely cured by standing still. In the process of performing the ultraviolet light irradiation, an ultraviolet light irradiating device 90 may move together with the nozzle 80. Since the ultraviolet light irradiating device 90 is only required to irradiate the ultraviolet-moisture dual-curing adhesive 70 to be semi-cured, the time as occupied by a single flexible display structure on the ultraviolet light irradiating device 90 can be reduced, which is advantageous to improve the production efficiency and reduce the production cost.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A flexible display structure, comprising: a reinforcing strip, and a flexible display panel, and a supporting layer that are laminated, wherein the flexible display panel is provided with a first surface and a second surface opposite to each other, and a first side surface connecting the first surface and the second surface, and the reinforcing strip is disposed on the first side surface and configured to adhere the flexible display panel to the supporting layer.

2. The flexible display structure according to claim 1, wherein the supporting layer is provided with a third surface and a fourth surface opposite to each other, and a second side surface connecting the third surface and the fourth surface, wherein the third surface is attached to the second surface, and an orthographic projection of the flexible display panel on the third surface is within the third surface; and wherein the reinforcing strip is configured to adhere the third surface and the first side surface, or the reinforcing strip is disposed on the second side surface and configured to adhere the third surface, the first side surface and the second side surface.

3. The flexible display structure according to claim 1, wherein the supporting layer is provided with a third surface and a fourth surface opposite to each other, and a second side surface connecting the third surface and the fourth surface, wherein the third surface is attached to the second surface, an orthographic projection of the flexible display panel on the third surface is in coincidence with the third surface, and the reinforcing strip is configured to adhere the first side surface and the second side surface.

4. The flexible display structure according to claim 2, wherein the reinforcing strip is distributed between a plane where the first surface is disposed and a plane where the fourth surface is disposed.

5. The flexible display structure according to claim 1, further comprising a transparent cover plate laminated on the flexible display panel, wherein the flexible display panel is disposed between the transparent cover plate and the supporting layer, and the reinforcing strip is configured to adhere the transparent cover plate and the flexible display panel.

6. The flexible display structure according to claim 5, wherein the transparent cover plate is provided with a fifth surface and a sixth surface opposite to each other, and a third side surface connecting the fifth surface and the sixth surface, wherein the sixth surface is attached to the first surface, and an orthographic projection of the flexible display panel on the sixth surface is within the sixth surface; and wherein the reinforcing strip is configured to adhere the sixth surface and the first side surface, or the reinforcing strip is disposed on the third side surface and configured to adhere the first side surface, the sixth surface and the third side surface.

7. The flexible display structure according to claim 5, wherein the transparent cover plate is provided with a fifth surface and a sixth surface opposite to each other, and a third side surface connecting the fifth surface and the sixth surface, wherein the sixth surface is attached to the first surface, an orthographic projection of the flexible display panel on the sixth surface is in coincidence with the sixth surface, and the reinforcing strip is configured to adhere the first side surface and the third side surface.

8. The flexible display structure according to claim 6, wherein the reinforcing strip is distributed between a plane where the fifth surface is disposed and a plane where a surface, distal from the flexible display panel, of the supporting layer is disposed.

9. The flexible display structure according to claim 1, wherein a surface, distal from the first side surface, of the reinforcing strip is a flat surface or a smooth curved surface.

10. The flexible display structure according to claim 1, wherein a distance between the first side surface and a surface, distal from the first side surface, of the reinforcing strip ranges from 5 μm to 300 μm.

11. The flexible display structure according to claim 1, wherein the reinforcing strip is arranged around the first side surface.

12. The flexible display structure according to claim 1, wherein the reinforcing strip is formed by curing an ultraviolet-moisture dual-curing adhesive.

13. The flexible display structure according to claim 1, wherein a storage modulus of the reinforcing strip ranges from 60 kpa to 150 kpa and a shear strength of the reinforcing strip ranges from 3 $kgf/cm^2$ to 5 $kgf/cm^2$.

14. The flexible display structure according to claim 1, wherein an adhesive layer is provided between the flexible display panel and the supporting layer, and an orthographic projection of the adhesive layer on the supporting layer is within an orthographic projection of the flexible display panel on the supporting layer.

15. The flexible display structure according to claim 1, wherein the flexible display panel comprises a panel body, a polarizer, and a polyethylene terephthalate film that are laminated, wherein the polarizer and the polyethylene terephthalate film are disposed on two sides of the panel body respectively, and the polyethylene terephthalate film and the supporting layer are disposed on a same side of the panel body.

16. A method for manufacturing a flexible display structure, comprising:
providing a flexible display panel and a supporting layer that are laminated, wherein the flexible display panel is provided with a first surface and a second surface opposite to each other, and a first side surface connecting the first surface and the second surface; and
forming a reinforcing strip on the first side surface, wherein the reinforcing strip is configured to adhere the flexible display panel to the supporting layer.

17. The method according to claim 16, wherein forming the reinforcing strip on the first side surface comprises:
spraying an ultraviolet-moisture dual-curing adhesive on the first side surface via a nozzle; and
forming the reinforcing strip by curing the ultraviolet-moisture dual-curing adhesive.

18. The method according to claim 17, wherein forming the reinforcing strip by curing the ultraviolet-moisture dual-curing adhesive comprises:
- irradiating, while spraying the ultraviolet-moisture dual-curing adhesive on the first side surface, the ultraviolet-moisture dual-curing adhesive as sprayed on the first side surface with ultraviolet light until the ultraviolet-moisture dual-curing adhesive is cured into the reinforcing strip.

19. The method according to claim 17, wherein forming the reinforcing strip by curing the ultraviolet-moisture dual-curing adhesive comprises:
- irradiating, while spraying the ultraviolet-moisture dual-curing adhesive on the first side surface, the ultraviolet-moisture dual-curing adhesive as sprayed on the first side surface with ultraviolet light until the ultraviolet-moisture dual-curing adhesive is semi-cured; and
- allowing the flexible display panel to stand still until the ultraviolet-moisture dual-curing adhesive is completely cured.

20. A display device comprising a flexible display structure, wherein the flexible display structure comprises a reinforcing strip, and a flexible display panel, and a supporting layer that are laminated,
- wherein the flexible display panel is provided with a first surface and a second surface opposite to each other, and a first side surface connecting the first surface and the second surface, and the reinforcing strip is disposed on the first side surface and configured to adhere the flexible display panel to the supporting layer.

* * * * *